(12) United States Patent
Zhang et al.

(10) Patent No.: US 11,247,190 B2
(45) Date of Patent: Feb. 15, 2022

(54) COMPOSITE MATERIAL, ITS MANUFACTURE AND USE IN GAS PURIFICATION

(71) Applicant: Nanyang Technological University, Singapore (SG)

(72) Inventors: Lan Zhang, Singapore (SG); Siew Hwa Chan, Singapore (SG); Ovi Lian Ding, Singapore (SG); Hongquan He, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 304 days.

(21) Appl. No.: 16/317,415

(22) PCT Filed: Jul. 28, 2017

(86) PCT No.: PCT/SG2017/050385
§ 371 (c)(1),
(2) Date: Jan. 11, 2019

(87) PCT Pub. No.: WO2018/021974
PCT Pub. Date: Feb. 1, 2018

(65) Prior Publication Data
US 2019/0151822 A1 May 23, 2019

(30) Foreign Application Priority Data
Jul. 28, 2016 (SG) .............. 10201606249T

(51) Int. Cl.
| | | |
|---|---|---|
| *B01J 20/10* | (2006.01) | |
| *B01J 20/12* | (2006.01) | |
| *B01D 53/02* | (2006.01) | |
| *B01D 53/68* | (2006.01) | |
| *B01D 53/82* | (2006.01) | |
| *B01J 20/20* | (2006.01) | |
| *B01J 20/30* | (2006.01) | |
| *B01J 20/32* | (2006.01) | |
| *B01J 20/28* | (2006.01) | |
| *B01J 20/06* | (2006.01) | |
| *C01B 3/50* | (2006.01) | |
| *B01J 20/02* | (2006.01) | |
| *B01D 53/40* | (2006.01) | |
| *B01D 53/42* | (2006.01) | |

(52) U.S. Cl.
CPC ............ *B01J 20/103* (2013.01); *B01D 53/02* (2013.01); *B01D 53/685* (2013.01); *B01D 53/82* (2013.01); *B01J 20/0244* (2013.01); *B01J 20/06* (2013.01); *B01J 20/12* (2013.01); *B01J 20/20* (2013.01); *B01J 20/28026* (2013.01); *B01J 20/3085* (2013.01); *B01J 20/3204* (2013.01); *B01J 20/327* (2013.01); *B01J 20/3248* (2013.01); *C01B 3/508* (2013.01); *B01D 53/40* (2013.01); *B01D 53/42* (2013.01); *B01D 2253/102* (2013.01); *B01D 2253/106* (2013.01); *B01D 2253/108* (2013.01); *B01D 2253/11* (2013.01); *B01D 2253/1124* (2013.01); *B01D 2253/202* (2013.01); *B01D 2253/25* (2013.01); *B01D 2253/308* (2013.01); *B01D 2256/16* (2013.01); *B01D 2257/2025* (2013.01); *B01J 20/28016* (2013.01); *C01B 2203/0465* (2013.01); *C01B 2203/0495* (2013.01); *C01B 2203/066* (2013.01)

(58) Field of Classification Search
CPC ...... B01J 20/10; B01J 20/103; B01J 20/0244; B01J 20/06; B01J 20/12; B01J 20/20; B01J 20/28026; B01J 20/3085; B01J 20/3204; B01J 20/3248; B01J 20/327; B01J 20/28016; B01D 53/02; B01D 53/685; B01D 53/82; B01D 53/40; B01D 53/42; B01D 2253/102; B01D 2253/106; B01D 2253/108; B01D 2253/11; B01D 2253/1124; B01D 2253/202; B01D 2253/25; B01D 2253/308; B01D 2256/16; B01D 2257/2025; C01B 3/508; C01B 2203/0465; C01B 2203/0495; C01B 2203/066
USPC ........................................................ 502/402
See application file for complete search history.

(56) References Cited

U.S. PATENT DOCUMENTS

2011/0172084 A1    7/2011    Jang

FOREIGN PATENT DOCUMENTS

| CN | 101695652 A | 4/2010 |
|---|---|---|
| CN | 103599757 | 2/2014 |
| CN | 103599757 A | 2/2014 |
| CN | 104353436 | 2/2015 |
| CN | 105381791 A | 3/2016 |

OTHER PUBLICATIONS

Kojima, Y. et al., "Hydrogen generation using sodium borohydride solution and metal catalyst coated on metal oxide" International Journal of Hydrogen Energy 2002, pp. 1029-1034.

(Continued)

*Primary Examiner* — Edward M Johnson

(57) ABSTRACT

The invention provides a composite material formed from an inorganic mesoporous, or mesoporous-like, material that is dispersed throughout a polymeric matrix formed by a cross-linked polymer that has acidic- or basic-residues and which may also optionally have further acidic- or basic-residues grafted onto the inorganic mesoporous material. The resulting composite material may be used to remove acidic or basic impurities from a gas in need thereof and can be easily regenerated.

20 Claims, 4 Drawing Sheets

(56) References Cited

OTHER PUBLICATIONS

Chinnappan, A. et al., "Hydrogen generation from the hydrolysis of sodium borohydride with new pyridinium dicationic salts containing transition metal complexes" International Journal of Hydrogen Energy 37, 2012, p. 10240-10248.
Jana, P. et al., "Mild temperature hydrogen production by methane decomposition over cobalt catalysts prepared with different precipitating agents" International Journal of Hydrogen Energy 37, 2012, pp. 7034-7041.
Ehteshami, S. M. M. et al., "A review on ions induced contamination of polymer electrolyte membrane fuel cells, poisoning mechanisms and mitigation approaches" Journal of Industrial and Engineering Chemistry 34, 2016, pp. 1-8.
Rose, S. et al., "Dynamics of Hybrid Polyacrylamide Hydrogels Containing Silica Nanoparticles Studied by Dynamic Light Scattering" Macromolecules, 2013, 46, pp. 4567-4574.
Huang, et al., "Amine-Grafted MCM-48 and Silica Xerogel as Superior Sorbents for Acidic Gas Removal from Natural Gas," Industrial and Engineering Chemistry Research, 42(12):2427-2433 (2003).
International Search Report for PCT/SG2017/050385, dated Oct. 10, 2017.
Shou, et al. "Ordered mesoporus carbon preparationg by the in situ radical polymerization of acrylamide and its application for resorcinol removal" Journal of Applied Polymer Science, DOI: 10.1002/APP 43426: 1-11(2016).
Tian-Yi Ma, et al. "Direct synthesis of ordered mesoporous carbons" Chem. Soc. Rev., 2013, 42, pp. 3977-4003, DOI: 10.1039/c2cs35301f.
Foreign Communication from a Related Counterpart Application, Chinese Office Action dated Jul. 23, 2021, Chinese Application No. 201780038469.6 filed on Jul. 28, 2017.

COMPOSITE MATERIAL, ITS MANUFACTURE AND USE IN GAS PURIFICATION

CROSS-REFERENCE TO RELATED APPLICATIONS

This application is a National Phase application under 35 U.S.C. § 371 of PCT/SG2017/050385, filed Jul. 28, 2017, and claims the benefit of and priority to Singapore Provisional Patent Application No. 10201606249T filed Jul. 28, 2016, the disclosure of which are hereby incorporated herein by reference in their entirety.

FIELD OF INVENTION

This invention relates to the development of an organic and inorganic composite material that may be moulded into any desired shape, which composite material may be used for purifying gas containing acidic and/or basic impurities.

BACKGROUND

Fossil fuels are a non-renewable form of energy that are expected to be exhausted by the end of the 21st century. Gasoline and diesel, in particular, are obtained from crude oil after fractional distillation in the oil refinery process and are the main source of fuel that powers today's cars. However, the combustion of gasoline and diesel produces undesirable compounds such as $NO_x$, $SO_x$, $H_2S$ and particulate emissions that are harmful to the environment. The anticipated rapid decline in fossil fuels, coupled with environmental pollution, has driven the search for alternative and cleaner power systems to drive such vehicles.

One of the potential replacements for vehicles using internal combustion engines are vehicles powered by fuel cells. Fuel cell vehicles are expected to be more efficient, (potentially three times more efficient) petrol engine cars. This is because the efficiency of a fuel cell is much higher than that of a conventional combustion engine (Kojima, Y., et al., *International Journal of Hydrogen Energy*, 2002. 27(10): p. 25 1029-1034.).

One of the market barriers to adopting vehicles powered by fuel cells is the availability and cost of producing pure hydrogen gas. The majority of hydrogen produced today is provided by steam reforming of natural gas or other hydrocarbons (Chinnappan, A., et al., *International Journal of Hydrogen Energy*, 2012. 37(13): p. 10240-10248.). Electrolysis of water using renewable energies, such as solar and wind is another method that can be used to produce hydrogen, but these methods are less common due to their high cost and relatively low efficiency (Jana, P., et al., *International Journal of Hydrogen Energy*, 2012. 37(8): p. 7034-7041.).

A further alternative source of hydrogen gas can be industrial processes where hydrogen is produced as a by-product. A good example of such an industrial process is the chlor-alkaline process. Chlor-alkaline plants discharge large amounts of hydrogen gas as a by-product while producing chlorine gas for other applications. However, the discharged gas contains chloride anion impurities that are known to have adverse effects on the performance of a fuel cell (S. M. M. Ehteshami, et al., *Journal of Industrial and Engineering Chemistry*, 2016. (34): p. 1-8.). Therefore, the discharged hydrogen gas must be purified to an acceptable level before it can be used in a hydrogen fuel cell system.

TABLE 1

Impurity concentration of 4 gas samples taken at 1 h interval

| Test | Method | Unit | Results |
| --- | --- | --- | --- |
| Carbon Monoxide | Methanizer | mol ppm | <1 |
| Carbon Dioxide | Methanizer | mol ppm | <1 |
| $CO_2/SO_2$ | ASTM D5504-08 | mol ppm | <0.01/<0.01 |
| Hydrogen sulfide | ASTM D5504-08 | mol ppm | <0.01 |
| Methane | GC-PDHID | mol ppm | <1 |
| Oxygen | GC-PDHID | mol ppm | 21.5 |
| Nitrogen | GC-PDHID | mol ppm | 10.5 |
| Hydrogen | UOP 539-12 | mol % | 98.24 |
| Chloride | C.I.C | wt. ppm | <5 |
| Water Content | Solvent Extract/Karl Fisher | vol % | 1.77 |
| Chlorine | Drager Tube | mol ppm | <0.3 |

Table 1 above shows the impurity concentration of discharged hydrogen gas from a chlor-alkaline plant in Singapore. Conventionally, these acidic gases are removed by gas-liquid absorption-stripping processes using aqueous solutions of alkanolamines. The most commonly used alkanolamines include monoethanolamine (MEA), diethanolamine (DEA) and methyldiethanolamine (MDEA) (H. Y. Huang, et al., *Industrial & Engineering Chemistry Research*, 2003. 42: p. 2427-2433). Though a mature technology being applied extensively today, this gas absorption process is highly energy-intensive because it requires significant energy costs to regenerate the alkanolamine solutions and it is also plagued by corrosion problems.

Thus, there remains a need for improved methods of removing acidic (or basic) impurities from gases provided as by products from industrial processes, as removing such impurities in a cheaper and more energy efficient manner may help to kick-start the fuel cell industry, amongst others.

SUMMARY OF INVENTION

In this invention, we have developed an organic and inorganic moulded composite and its fabrication process with the intended application in gas purification.

Thus, in a first aspect of the invention there is provided a composite material comprising:
  a particulate adsorbing material; and
  a crosslinked polymer comprising acidic or basic residues, wherein
  the particulate adsorbing material is dispersed within a polymer matrix formed by the crosslinked polymer, and the particulate adsorbing material is selected from one or more of the group consisting of mesoporous silica, mesoporous carbon, mesoporous zinc oxide, a bentonite clay, and a kaolinite clay.

In embodiments of the first aspect of the invention:
  (a) the weight:weight ratio of the particulate adsorbing material to crosslinked polymer may be from 0.5:1 to 5:1;
  (b) the particulate adsorbing material may be selected from one or more of the group consisting of mesoporous silica, a bentonite clay, and a kaolinite clay (i.e. the particulate adsorbing material may be a mesoporous silica, optionally wherein the particulate adsorbing material may be a mesoporous silica selected from one or more of the group consisting of SBA-15, SBA-16, MCM-41, MCM-48, HMS, MSU-F, MSU-H, and MSU-X (e.g. the particulate adsorbing material is a mesoporous silica selected from SBA-15 and/or MCM-41);

(c) the particulate adsorbing material may further comprise functional groups selected from a $C_{1-10}$ alkylamine and a $C_{1-10}$ alkylcarboxylic acid (e.g. the $C_{1-10}$ alkylamine may be n-propylamine), said functional groups may be present in a weight ratio with respect to the particulate material that may be from 0.05:1 to 1:1, such as from 0.07:1 to 0.25:1, such as from 0.09:1 to 0.23:1;

(d) when the crosslinked polymer has basic residues, it may be formed from a monomeric material that may be preferably water soluble and which has at least one ethylenic bond and an amide functional group, optionally wherein the monomeric materials may be selected from one or more of the group consisting of acrylamide, methacrylamide, an alkyl-acrylamide, an alkyl-methacrylamide, dimethyl aminopropyl methacrylamide, a hydroxy-alkyl acrylamide, and a hydroxy-alkyl methacrylamide;

(e) when the crosslinked polymer has basic residues, the weight:weight ratio of the particulate adsorbing material to crosslinked polymer may be from 0.8:1 to 2:1;

(f) when the crosslinked polymer has acidic residues, it may be formed from a monomeric material that may be preferably water soluble and which has at least one ethylenic bond and a carboxylic acid functional group, optionally wherein the monomeric material may be methacrylic acid and/or acrylic acid or, more particularly, acrylic acid;

(g) when the crosslinked polymer has acidic residues, the weight:weight ratio of the particulate adsorbing material to crosslinked polymer may be from 2:1 to 4.2:1;

(h) the crosslinked polymer may comprise a residue from a crosslinking agent and the crosslinking agent may be selected from one or more of the group consisting of N,N'-methylenebis(acrylamide) and N,N'-diallyl-L-tartardiamide (e.g. the crosslinking agent may be N,N'-methylenebis(acrylamide)) and, in (i) the crosslinked polymer may be formed using a weight:weight ratio of from 5:1 to 50:1 of a monomer to a crosslinking agent, optionally wherein the weight:weight ratio may be from 10:1 to 25:1, such as 15:1.

In specific embodiments of the first aspect of the invention, the composite material may be a composite comprising mesoporous silica (e.g. MCM-41) and crosslinked acrylamide in a weight:weight ratio of about 1.56:1 (e.g. 1.5625:1), where the crosslinking agent is N,N'-methylenebis(acrylamide), which is present in a weight:weight ratio of 1:15 with respect to the acrylamide monomer. In alternative embodiments that may be mentioned herein, the composite may be a composite comprising a n-propylamine-functionalised mesoporous silica (e.g. MCM-41) and crosslinked acrylamide in a weight:weight ratio of about 1.71:1, where the crosslinking agent is N,N'-methylenebis(acrylamide), which is present in a weight:weight ratio of 1:15 with respect to the acrylamide monomer and the functional group is present in about a 0.37:1 weight ratio with respect to the mesoporous silica.

In a second aspect of the invention, there is provided a method of forming a composite material according to the first aspect of the invention and any technically sensible combination of its embodiments, wherein the process comprises the steps of:

(i) forming a mixture comprising a particulate adsorbing material, at least one monomer having an ethylenic bond and a carboxylic acid or basic functional group, a crosslinking agent, a polymerisation initiator and a catalyst in a solvent; and (ii) initiating a polymerisation reaction to form the composite material.

In embodiments of the second aspect of the invention:

(a) the initiator may be ammonium or potassium persulfate, the catalyst may be N,N,N',N'-tetramethylethylenediamine and the solvent may comprise water (e.g. the solvent is water);

(b) the mixture in step (i) of the second aspect of the invention may further comprise a $C_{1-10}$ alkylaminetrialkyloxysilane or a $C_{1-10}$ alkylcarboxylic acid trialkyloxysilane (e.g. the $C_{1-10}$ alkylaminetrialkyloxysilane may be (3-aminopropyl)triethoxysilane), or the particulate adsorbing material may be provided pre-functionalized by $C_{1-10}$ alkylamine or $C_{1-10}$ alkylcarboxylic acid groups (e.g. the particulate adsorbing material may be provided pre-functionalized by n-propylamine);

(c) the process may further comprise ball milling of the mixture formed in step (i) of the second aspect of the invention.

In a third aspect of the invention, there is provided a use of a composite material according to the first aspect of the invention and any technically sensible combination of its embodiments to remove acidic or basic impurities from a gas in need thereof, wherein a composite material comprising acidic residues is used to remove basic impurities and a composite material comprising basic residues is used to remove acidic impurities.

In a fourth aspect of the invention, there is provided a method of purifying a gas, comprising contacting a gas with a composite material according to the first aspect of the invention and any technically sensible combination of its embodiments, wherein a composite material comprising acidic residues is used to remove basic impurities from a gas in need thereof and a composite material comprising basic residues is used to remove acidic impurities from a gas in need thereof.

DESCRIPTION

Figure 1:
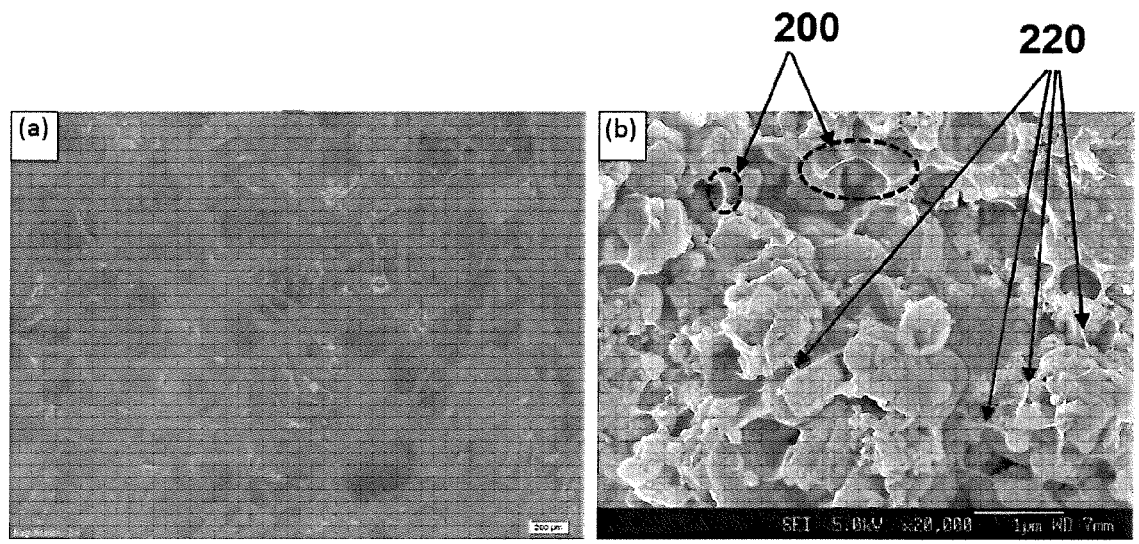
FIG. 1 shows a stereo microscope image of pristine C-PAM (composite-polyacrylamide) in (a) and a scanning electron microscopy (SEM) image of mesoporous MCM-41 particles within C-PAM in (b).

It has been found that a composite material comprising a adsorbing material and a crosslinked polymer material is surprisingly effective in adsorbing acidic and basic gases that may be found as impurities within desirable gas stream, such as hydrogen gas.

Thus, there is provided a composite material comprising:
a particulate adsorbing material; and
a crosslinked polymer comprising acidic or basic residues, wherein
the particulate adsorbing material is dispersed within a polymer matrix formed by the crosslinked polymer, and the particulate adsorbing material is selected from one or more of the group consisting of mesoporous silica, mesoporous carbon, mesoporous zinc oxide, a bentonite clay, and a kaolinite clay.

The particulate adsorbing material may be provided in particles having a particle size of from 100 nm to 100 μm as measured by dynamic light scattering. For example, when the particulate adsorbing material is mesoporous silica, the average particle size as measured by dynamic light scattering may be from 100 nm to 500 nm, such as 200 nm, with an average pore size that may be from 1 nm to 10 nm, such as 4 nm. Suitable mesoporous silicas that may be mentioned herein include, but are not limited to, SBA-15, SBA-16, MCM-41, MCM-48, HMS, MSU-F, MSU-H, and MSU-X. In another example, when the particulate adsorbing material is mesoporous carbon, the average particle size as measured by dynamic light scattering may be from 400 nm to 100 μm, such as an average size of 500 nm or from 5 μm to 50 μm, with an average pore size that may be from 0.1 nm to 20 nm, such as from 0.4 nm to 10 nm.

The term "bentonite clay" when used herein refers to an absorbent aluminium phyllosilicate clay that consists mostly of montmorillonite. Kinds of bentonite clay that may be mentioned herein include, potassium bentonite, sodium bentonite and calcium bentonite clays. The term "kaolinite clay" when used herein refers to a clay mineral that is rich in the composition $Al_2Si_2O_5(OH)_4$.

In particular embodiments of the invention that may be mentioned herein, the particulate adsorbing material may be selected from one or more of the group consisting of mesoporous silica, a bentonite clay, and a kaolinite clay. For example, the particulate adsorbing material may be mesoporous silica that may be selected from one or more of the group including, but not limited to, SBA-15, SBA-16, MCM-41, MCM-48, HMS, MSU-F, MSU-H, and MSU-X (e.g. the particulate adsorbing material may be a mesoporous silica selected from SBA-15 and/or MCM-41).

In certain embodiments of the invention that may be mentioned herein, the particulate adsorbing material may further comprise functional groups selected from a $C_{1-10}$ alkylamine and a $C_{1-10}$ alkylcarboxylic acid. These may be described herein as "grafted" functional groups that have been attached to the particulate adsorbing material by any reasonable means, for example by covalent bonding. It will be appreciated that alkylamine functional groups grafted onto a particulate adsorbing material may be useful for a composite material that is aimed at removing acidic impurities, while an alkylcarboxylic acid may be useful for a composite material that is to be used to remove basic impurities. A suitable alkylamine functional group is n-propylamine and a suitable alkylcarboxylic acid functional group that may be mentioned herein is n-propylcarboxylic acid. Particulate adsorbing materials with grafted functional groups may be commercially available or may be made using conventional methods. The weight:weight ratio of the grafted functional groups to the particulate material to which it is bound may be from 0.05:1 to 1:1, such as from 0.07:1 to 0.25:1, such as from 0.09:1 to 0.23:1.

In certain embodiments of the invention, the weight:weight ratio of the particulate adsorbing material to crosslinked polymer may be from 0.5:1 to 5:1. It will be appreciated that the weight:weight ratio of the particulate adsorbing material to crosslinked polymer may vary depending on whether the polymer has acidic or basic residues. For example, in certain embodiments of the invention that may be mentioned herein, when the crosslinked polymer has basic residues, the weight:weight ratio of the particulate adsorbing material to crosslinked polymer may be from 0.8:1 to 2:1. Further, in alternative embodiments of the invention that may be mentioned herein, when the crosslinked polymer has acidic residues, the weight:weight ratio of the particulate adsorbing material to crosslinked polymer may be from 2:1 to 4.2:1.

The crosslinked polymer comprising acidic or basic residues may be particularly derived from a monomeric material that has at least one ethylenic bond and an amide functional group (as the basic residues) or a carboxylic acid functional group (as the acidic residues). For example, when the crosslinked polymer has basic residues, the polymer may be derived from acrylamide monomeric materials, such as acrylamide, methacrylamide, an alkyl-acrylamide, an alkyl-methacrylamide, dimethyl aminopropyl methacrylamide, a hydroxy-alkyl acrylamide, a hydroxy-alkyl methacrylamide and copolymers thereof. In alternative embodiments, when the crosslinked polymer has acidic residues, the polymer may be derived from methacrylic acid and/or acrylic acid or, more particularly, acrylic acid.

When used herein, "ethylenic bond" refers to a carbon to carbon double bond where one of the carbon atoms is only substituted by hydrogen (e.g. $H_2C=CR_1R_2$, where at least one of $R_1$ and $R_2$ is not hydrogen).

The presence of a polymeric material as part of the composite allows a great degree of structural flexibility, which may enable the composite material to be moulded to any desired shape. This is a useful feature, as the composite material may need to be designed to have a particular shape if it is to be retrofitted to an existing device in order to maximise adsorption.

As noted hereinbefore, the polymer comprising acidic or basic residues is a crosslinked polymer. It is essential that crosslinking is achieved as crosslinking prevents the polymer network from dissolving into a liquid solution and allows the resulting beads of composite material (e.g. C-PAM (crosslinked-polyacrylamide) beads) to absorb liquids.

As such, the polymer further comprises residual element(s) derived from a crosslinking agent. Suitable crosslinking agents that may be used herein include, but are not limited to N,N'-methylenebis(acrylamide) and N,N'-diallyl-L-tartardiamide (and combinations thereof). A particular crosslinking agent that may be mentioned herein is N,N'-methylenebis(acrylamide). The crosslinked polymer may be formed using a weight:weight ratio of from 5:1 to 50:1 of a monomer to crosslinking agent, or, more particularly using a weight:weight ratio of from 10:1 to 25:1, such as 15:1.

It is an object of the current invention to be as environmentally-friendly as possible. As such, it is desired that the monomeric materials and crosslinking agents used in the formation of the crosslinked polymeric material are water-soluble.

It will be appreciated that the composite materials described herein may be particularly suited to removing contaminants from a gas. Thus, in a further aspect of the invention there is provided a use of the composite materials described herein to remove acidic or basic impurities from a gas in need thereof, wherein a composite material comprising acidic residues is used to remove basic impurities and a composite material comprising basic residues is used to remove acidic impurities.

In yet a further aspect of the invention, there is provided a method of purifying a gas, comprising contacting a gas with a composite material selected from those discussed herein, wherein a composite material comprising acidic residues is used to remove basic impurities from a gas in need thereof and a composite material comprising basic residues is used to remove acidic impurities from a gas in need thereof.

It will be appreciated that basic residue-containing composite materials of the current invention after being used to trap acidic impurities may be regenerated by immersion in an alkaline solution (e.g. aqueous sodium hydroxide solution) for a suitable period of time.

Similarly, acidic residue-containing composite materials of the current invention after being used to trap basic impurities may be regenerated by immersion in an acidic solution (e.g. aqueous hydrogen chloride or sulfuric acid solutions) for a suitable period of time.

Particular composite materials of the current invention that may be mentioned herein include:

(a) a composite comprising mesoporous silica (e.g. MCM-41) and crosslinked acrylamide in a weight:weight ratio of about 1.56:1 (e.g. 1.5625:1), where the crosslinking agent is N,N'-methylenebis(acrylamide), which is present in a weight:weight ratio of 1:15 with respect to the acrylamide monomer; and (b) a composite comprising a n-propylamine-functionalised mesoporous silica (e.g. MCM-41) and crosslinked acrylamide in a weight:weight ratio of about 1.71:1, where the crosslinking agent is N,N'-methylenebis(acrylamide), which is present in a weight:weight ratio of 1:15 with respect to the acrylamide monomer and the functional group is present in about a 0.37:1 weight ratio with respect to the mesoporous silica.

Advantages associated with the current invention include the following.

1. The composite materials disclosed herein are an organic/inorganic composite material, where the inorganic particulate adsorbing material is dispersed throughout an organic crosslinked polymeric matrix. As the inorganic material is selected from mesoporous materials (including minerals with a mesoporous structure), the composite material is able to maintain its shape upon contact with moisture from a gas that is to be purified. In other words, the composite material of the current invention does not suffer from shrinkage when exposed to a moist gas. This advantage applies equally to acidic-residue containing composite materials (e.g. the composite material of Example 4 below), or to basic-residue containing composite materials (e.g. an acrylamide crosslinked with N,N'-methylenebis(acrylamide) (MBAM) with mesoporous silica (with or without functionalised amines being present, such as Examples 1 and 2 below)) of the current invention. In contrast, other solid-phase materials used in gas purification tend to be formed from organic components only. An example of such a solid-phase organic material is the Purolite™ resin PFA6000H (a quaternary amine polystyrene crosslinked with divinylbenzene copolymer in the hydroxide form). The polystyrene beads of PFA6000H suffer from shrinkage when exposed to a gas that contains water vapour and so this reduces the efficiency and efficacy of adsorption offered by this material, as fewer basic sites are accessible to bond with HCl.

2. The composite materials of the current invention (e.g. an amine-grafted silica-based composite material) are in the solid phase and so does not suffer from solvent evaporation, which is an advantage over the majority of the commonly used amines used for adsorption, including monoethanolamine (MEA), diethanolamine (DEA) and methyldiethanolamine (MDEA), as these are supplied in the liquid phase with a solvent. As such, the composite materials of the current invention require simpler adsorption equipment and thus present a simpler system with reduced maintenance and operating costs.

3. As the composite materials of the current invention include both an organic and an inorganic component, the composite material can be moulded to any desired shape (e.g. tube, stick, slice, beads and so on).

4. The composite materials have a high adsorption capacity (e.g. from 50 to 200 mg/g (i.e. from 59 to 120 mg/g) for basic-residue containing composites to from 10 to 100 mg/g (i.e. from 10 to 50 mg/g) for acidic-residue containing composites). For example, and without wishing to be bound by theory, a crosslinked acrylamide polymer with mesoporous silica (adsorption capacity of from 55 to 80 mg/g) is believed to adsorb chloride ions through the weakly alkaline nature of the amide functional group, which can anchor a chloride anion by way of chemical reaction; and in an acidic environment, there is an acid-base reaction between silanol and HCl, resulting in further adsorption of chloride anions. It will be appreciated that the adsorption capacity of the composite may be further increased to from 90 to 200 mg/g (e.g. from 95 to 110 mg/g) by grafting amine functional groups onto the mesoporous silica.

5. The composite materials of the current invention may be formed in a single step—by mixing the particulate adsorbing material with a monomer and crosslinking agent. In addition, the grafting of functional groups onto the particulate adsorbing material may also be accomplished within the same step. This enables the composite material to be prepared at a low cost and in an environmentally-friendly manner, through the use of water as solvent in the polymerisation step.

6. Given the adsorption capacities noted above and the ease of manufacture and shaping of the composite material disclosed herein, it is possible to design scrubbers that will be expected to last for a defined period of time for any given plant. In other words, knowing the amount of the impurity to be removed from a gas in an industrial plant over a defined period of time, it is possible to provide a shaped composite material according to the current invention that will adsorb the impurities in the gas for at least that defined period of time before it needs to be replaced and regenerated.

7. As mentioned above, the composite materials of the current invention absorb water as well as adsorb the impurity that they are targeted at removing. Without wishing to be bound by theory, it is believed that this ability to absorb water into the composite material may help to improve the adsorption capacity of the composite material. This may be seen in Example 5 below, where a kaolinite/acrylic acid composite material is able to adsorb less than 10 mg/g when the impure gas used is dry, but is able to adsorb 48.3 mg/g when the impure gas used is wet.

As mentioned herein, the composite materials are able to absorb a certain amount of water. The amount of water uptake should be controlled to fall within a reasonable range, as if the water absorbance is too high, the composite beads will swell up to such an extent that a purification chamber where they are situated (or exhaust flue etc.) will become blocked to the passage of gas, which would result in the shut-down of the system (e.g. as a safety valve/bursting disc opens to prevent the dangerous build-up of gas pressure). On the other hand, if the water absorbance is too low, the composite material will not be able to make use of water in helping improve its adsorption capabilities, which may result in large gaps existing between composite material beads, thereby allowing the gas (and therefore the impurity) to pass through unimpeded and resulting in a lower efficiency in removal of the impurities. When the amount of water absorbance is in a suitable range, the composite material can swell to a certain extent to prevent large gaps existing between the composite material, while still allowing passage of gas in a safe manner, and the presence of water may also assist in the adsorption conducted by the composite material, as shown in Example 5 below. A suitable range of water absorbance by the composite materials mentioned herein may be from 100 wt % to 200 wt % of the composite material, such as from 125 wt % to 185 wt % of the composite material. It will be understood that 100 wt % water absorbance means that 1 g of the composite material can absorb 1 g of water.

In summary, the composite materials disclosed herein can significantly enhance the purification efficiency and reduce the running costs of a gas purification process, while also being environmentally friendly, non-toxic and easy to regenerate.

The composite materials disclosed herein may be manufactured using a process that comprises the steps of:
(i) forming a mixture comprising a particulate adsorbing material, at least one monomer having an ethylenic bond and a carboxylic acid or basic functional group, a crosslinking agent, a polymerisation initiator and a catalyst in a solvent; and
(ii) initiating a polymerisation reaction to form the composite material.

Terms such as "particulate adsorbing material" and "at least one monomer having an ethylenic bond and a carboxylic acid or basic functional group" are as defined hereinbefore, or may be directly and unambiguously derived from the analogous terms used hereinbefore.

The monomer may be an acrylic monomer having a carboxylic acid or basic functional group as discussed hereinbefore. A suitable initiator may be ammonium or potassium persulfate, a suitable catalyst is N,N,N',N'-tetramethylethylenediamine and a suitable solvent may comprise water or may be water.

As noted hereinbefore, the particulate adsorbing material may be a material that has acidic or basic functional groups grafted onto it, that is attached to said material by any suitable means, such as covalent bonding. Thus, in step (i), the particulate adsorbing material may be provided in a pre-grafted form (e.g. from commercial sources with, for example, n-propylamine functionalisation) or it may be provided in an ungrafted form that is functionalised during the process of step (i). When the particulate adsorbing material is functionalised in situ in step (i) the mixture in step (i) may further comprise a $C_{1-10}$ alkylaminetrialkyloxysilane (for the introduction of basic functional groups) or a $C_{1-10}$ alkylcarboxylic acid trialkyloxysilane (for the introduction of acidic functional groups). For example, when the particulate adsorbing material is functionalised in situ in step (i), the mixture may comprise (3-aminopropyl)triethoxysilane.

When used herein "$C_{1-10}$ alkylaminetrialkyloxysilane", the "$C_{1-10}$" refers to the alkylamine moiety of the alkylaminetrialkyloxysilane molecule. Each "alkyloxy" moiety of the alkylaminetrialkyloxysilane molecule may be any suitable alkyloxy group, such as a $C_{1-3}$ alkoxy group like methoxy, ethoxy or propoxy. Similarly, when used herein "$C_{1-10}$ alkylcarboxylic acid trialkyloxysilane", the "$C_{1-10}$" refers to the alkylcarboxylic acid moiety of the alkylcarboxylic acid trialkyloxysilane molecule. Each "alkyloxy" moiety of the alkylcarboxylic acid trialkyloxysilane molecule may be any suitable alkyloxy group, such as a $C_{1-3}$ alkoxy group such as methoxy, ethoxy or propoxy.

In certain embodiments of the invention, the process may further comprise ball milling of the mixture formed in step (i). The ball-milling enables the formation of homogeneous slurry that may then be moulded to form desired shapes for use.

In an example embodiment, the formation of a polymer containing basic residues is described below. The process may be adapted as required (and as described in the following examples) to provide composite materials that match the required functionality. In this example embodiment, 3-aminopropyltriethoxy-silane (99%, from Sigma-Aldrich) was added into de-ionised water and subsequently adjusted to pH 2-4 by adding nitric acid solution under constant stirring. A certain amount of a mesoporous substrate (e.g. a mesoporous silica) was added into this premixed solution and left to stir overnight. A dispersant, acrylamide (AM) and N,N'-methylenebis(acrylamide) (MBAM) with a weight: weight ratio of 15:1 (AM:MBAM) were added into the as-prepared mixture. The mixture then underwent planetary ball milling for ≥30 min followed by de-gassing to achieve a homogeneous slurry. An ammonium persulfate (APS) solution (2 wt. %) and an N,N,N',N'tetramethylethylenediamine (TEMED) solution (2 wt. %) were then mixed with the homogenous slurry to obtain a mixed slurry. The mixed slurry was then sucked into a silicone tube and heated at 80° C. in an oven for 45 min. The mixture was then removed from the tube for cutting and drying. The mixed slurry could also be dropped into oil-based media to form spherical beads. The as-prepared composite beads were then filtered, washed and dried.

As an example of "oil-based media", an amount (300 g) of hydrophobic graphite powders may be added to an oil (e.g. Enerpac™ hydraulic oil, 600 g) to form the oil-based media. The graphite powders disperse into the oil to provide a graphite-oil media which has a higher density and viscosity than the oil itself. When the slurry (above) is dropped into the graphite-oil media, the volume of graphite-oil media displaced is the same as the volume of oil that would have been displaced if oil was used instead. Since the graphite-oil media has a higher density than the oil alone, the mass displaced by the slurry droplets is increased, which enables the slurry droplets to be suspended or slowly sink in the graphite-oil media, enabling them to form spherical beads as they sink. Accordingly, the system is easily set-up in the lab and also scaled up for industrial use.

In order that the invention may be readily understood and put into practical effect, particular embodiments will now be described by way of the following non-limiting examples.

EXAMPLES

General Procedure 1
Testing Chloride Adsorption Capacity of the Composite Beads

Figure 3:
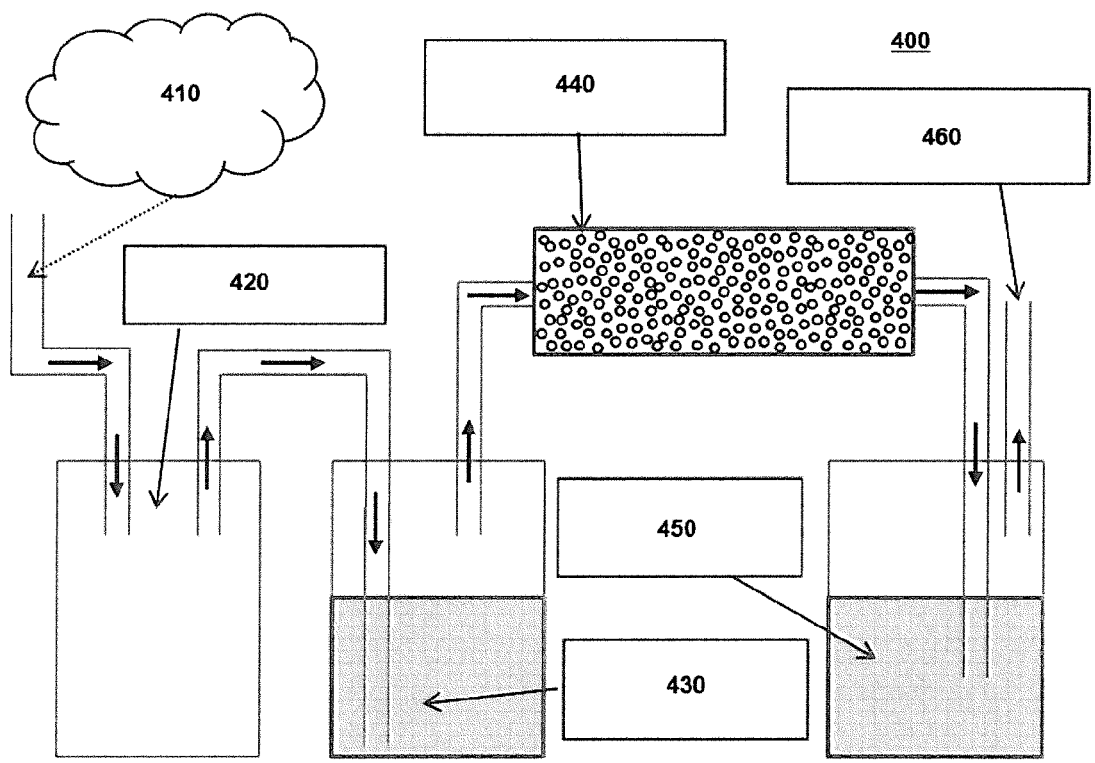
FIG. 3 is a schematic setup showing the simulated testing for chloride anion removal.

Simulated gas purification testing will be described with reference to FIG. 3. The equipment 400 was placed in an oven with a testing temperature of 40° C. A nitrogen carrier gas 410 was provided from a nitrogen source outside of the oven. The nitrogen first passes through a mass flow controller (not shown) that controls the flow rate of the nitrogen gas and then enters a buffer container 420. The buffer container is provided to prevent the backflow of the HCl solution into the mass flow controller. The gas is then bubbled through a container 430 containing an aqueous HCl solution (approximately 18.3 wt. % of HCl), which was used as the Cl⁻ source. The resulting chloride-containing gas was then passed through a tube 440 containing dry composite beads and is then bubbled through a container 450 containing a 0.1 wt. % NaOH solution, which was used to neutralise any escaping HCl vapour before the gas was vented 460.

The Cl⁻ anion concentration in the NaOH solution was measured, and the starting Cl⁻ concentration was initially recorded (which can be less than 0.3 ppm). The Cl⁻ anion concentration of the NaOH solution was then measured every 2 h using an ion chromatography (IC) machine. Once the Cl⁻ anion concentration was over 1 ppm, it meant that the composite beads were saturated. The adsorption capacity of the composite beads can then be calculated.

The weight of the HCl solution, which was used to simulate a chloride ion source, was measured before and after chloride removal testing to determine how much chloride anions were removed from the HCl solution in the process. The concentration of the chloride anions in the HCl solution before and after the chloride removal testing was also measured using an IC machine. The difference between A and B in equations 1 and 2, which is the weight of the chloride in HCl solution before (A) and after (8) the chloride removal testing respectively, determines the weight of the chloride anions removed from the HCl solution. The composite beads are deemed to be saturated with chloride anions, i.e. they have reached their maximum adsorption capacity, when the chloride anions detected in the NaOH solution exceeded 1 ppm.

$$W_1 \times C_1 \times 10000 = A \qquad (1)$$

$$W_2 \times C_2 \times 10000 = B \qquad (2)$$

Where $W_1$ is the weight of the HCl solution, $C_1$ is the percentage of chloride ion concentration measured by IC machine and A is the weight of chloride anions in the HCl solution before the chloride removal test was conducted. $W_2$ is the weight of the HCl solution, $C_2$ is the percentage of chloride ion concentration and B is the weight of the chloride anions after the chloride removal test has been completed. Both equations 1 and 2 were multiplied by a factor of 10000 because the solutions to be tested in the IC machine have been diluted by 10000 times in order to meet the concentration requirement of between 0.1 ppm to 20 ppm, as required by the IC machine. The weight of the C-MCM-41/PAM composite beads was measured before the chloride anions removal testing in order to determine the chloride anions removal efficiency. Equation 3 shows how the chloride anions removal efficiency can be obtained.

$$\text{Chloride Removal Efficiency} = \frac{A-B}{C} g_{Cl^-} / g_{C-MCM-41/PAM} \qquad (3)$$

Where C is the weight of the C-MCM-41/PAM composite beads before chloride anions removal testing and A and B are taken from equations (1) and (2), respectively.

General Procedure 2
Testing Ammonia Adsorption Capacity of the Composite Beads

Figure 5:
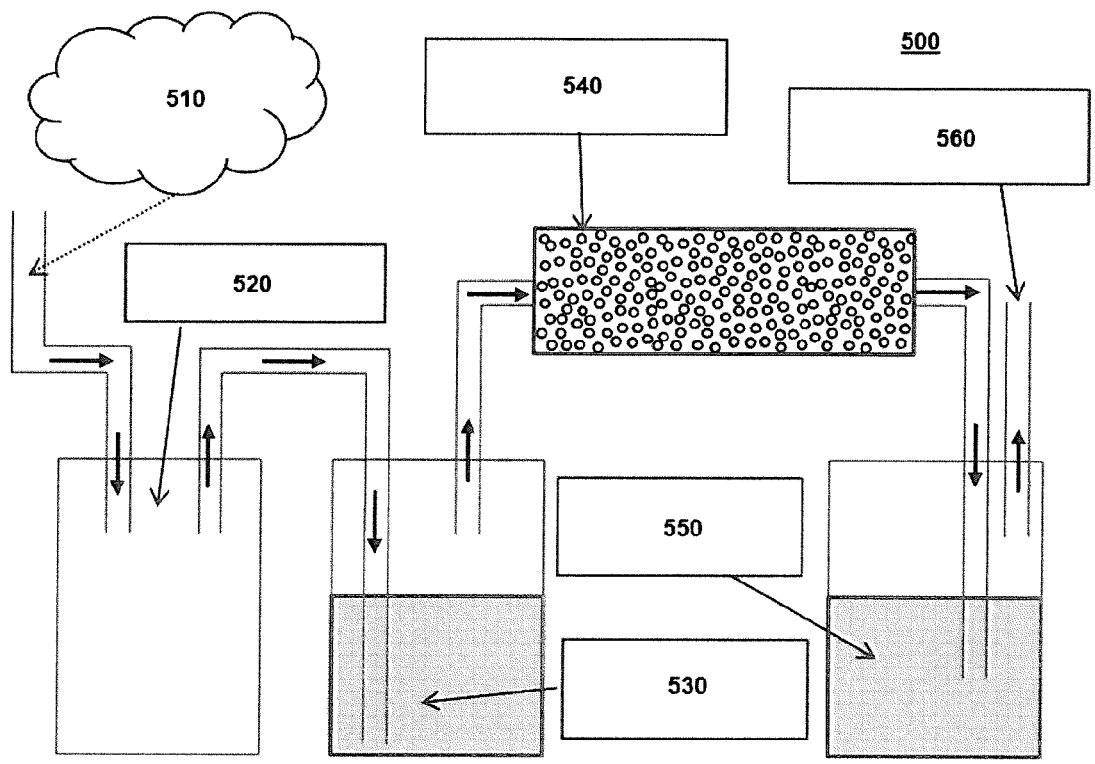
FIG. 5 is a schematic setup showing the simulated testing for ammonium cation removal.

Simulated gas purification testing will be described with reference to FIG. 5. The equipment 500 was placed in an oven with a testing temperature of 25° C. A nitrogen carrier gas 510 was provided from a nitrogen source outside of the oven 510. The nitrogen first passes through a mass flow controller (not shown) that controls the flow rate of the nitrogen gas and then enters a buffer container 520. The buffer container is provided to prevent the backflow of ammonia solution into the mass flow controller. The gas is then bubbled through a container 530 containing an aqueous ammonia solution (approximately from 3.8 to 5.2 wt. % ammonia), which was used as the basic source. The resulting ammonia-containing gas was then passed through a tube 540 containing wet composite bars and is then bubbled through a container 550 containing an approximately 0.1 wt. % HCl solution, which was used to neutralise any escaping ammonia vapour before the gas was vented 560.

The ammonium cation concentration in the HCl solution was measured, and the starting ammonium ion concentration was initially recorded (which can be less than 0.3 ppm). The ammonium ion concentration of the HCl solution was then measured every 15 min using an ion chromatography (IC) machine. Once the ammonium ion concentration was over 1 ppm, it meant that the composite beads were saturated. The adsorption capacity of the composite bars can then be calculated.

The weight of the ammonia solution, which was used to simulate an ammonium ion source, was measured before and after the ammonia removal testing to determine the quantity of ammonium cations that were removed from the ammonia solution during the removal process. The concentration of the ammonium cations in the ammonia solution before and after the ammonia removal testing was also measured using the IC machine. The difference between D and E obtained from equations 4 and 5, which is the weight of the ammonium cations in the ammonia solution before (D) and after (E) the ammonia removal testing respectively, determines the weight of the ammonium cations removed from the ammonia solution. The wet composite bars are deemed to be saturated with ammonium cations, i.e. they have reached maximum adsorption capacity, when the ammonium cations detected in the HCl solution exceed 1 ppm.

$$W_3 \times C_3 \times 10000 = D \qquad (4)$$

$$W_4 \times C_4 \times 10000 = E \qquad (5)$$

Where $W_3$ is the weight of the ammonia solution, $C_3$ is the percentage ammonium cation concentration measured by IC machine and D is the weight of ammonium cations in the ammonia solution before the ammonia removal testing. $W_4$ is the weight of the ammonia solution, $C_4$ is the percentage ammonium cation concentration and E is the weight of the ammonium cations after the ammonia removal testing. Both equations 4 and 5 have been multiplied by a factor of 10000 because the solutions to be tested in the IC machine have been diluted by 10000 times in order to meet the concentration requirement of between 0.1 ppm to 20 ppm, as required by the IC machine. The weight of the wet C-MCM-41/PAC (PAC: polyacrylic acid) composite bars was measured before the ammonia removal testing in order to determine the ammonium cations removal efficiency. Equation 6 shows how the ammonium cations removal efficiency can be obtained.

$$\text{Ammonimum Removal Efficiency} = \frac{D-E}{F} g^+_{NH4}/g_{C-MCM-41/PAC} \quad (6)$$

Where F is the weight of the wet C-MCM-41/PAC composite bars before ammonium cations removal testing and D and E come from equations (4) and (5), respectively.

Example 1. Fabrication of Mesoporous Silica/Acrylamide Composite 40 g of mesoporous silica (MCM-41) powders, 0.7 g of a commercial dispersant (acrylic acid, ammonium salt polymer, catalog No. 8678, MONOMER-POLYMER AND DAJAC LABS) and 0.2 g of polyvinylpyrrolidone, were added into a premixed solution consisting of 24 g of acrylamide (AM) and 1.6 g of N,N'-methylenebis(acrylamide) (MBAM) in 96 g of $H_2O$. The mixture then underwent planetary ball milling for ≥30 min, followed by de-gassing to obtain a homogeneous slurry. 24 g of 2 wt. % ammonium persulfate (APS) solution and 12 g of 2 wt. % N,N,N'N'-tetramethylethylenediamine (TEMED) solution were then added into the homogenous slurry to achieve a mixed slurry. The mixed slurry was then sucked into a silicone tube and heated at 80° C. in an oven for 45 min. The mixture was then extracted out for cutting and freeze drying. The chloride anions removal efficiency of the composite bars was found to be ~59 mg·g$^{-1}$.

Figure 2:
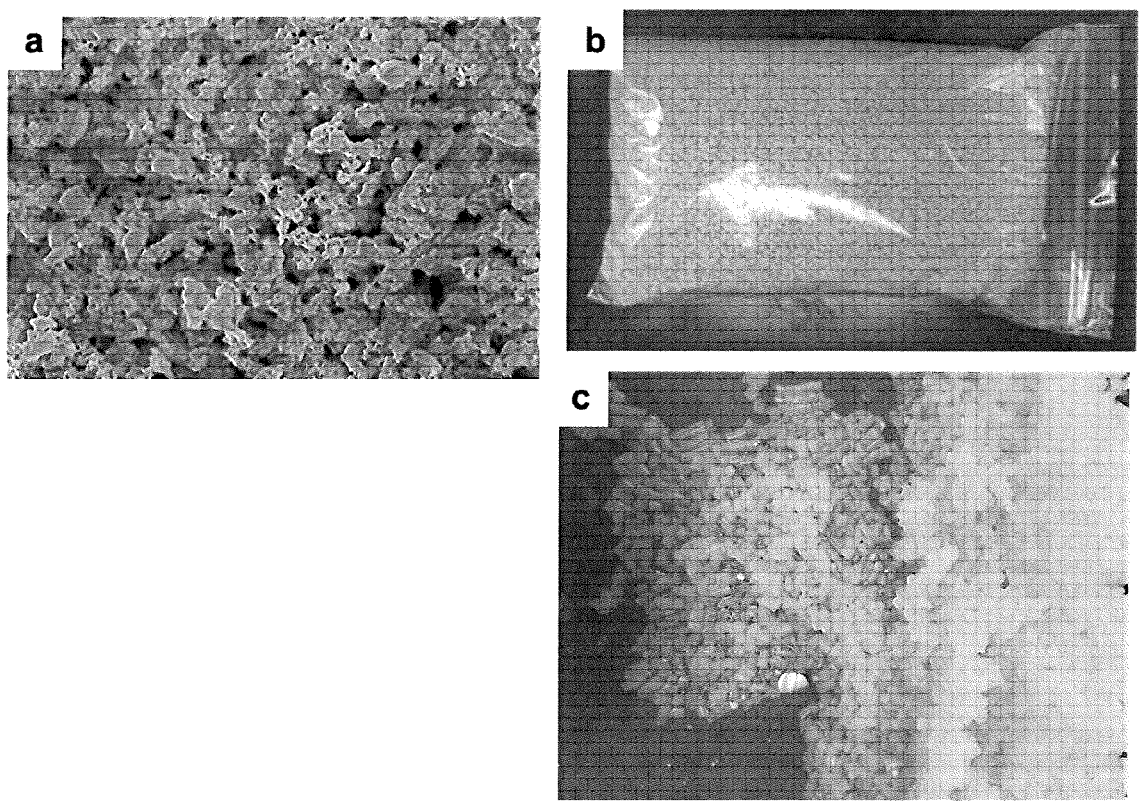
FIG. 2 (a) depicts a SEM image of C-MCM-41/PAM composite beads, (b) and (c) are photographs of these composite beads.

FIG. 1 (a) provides a stereo microscope image of pristine C-PAM. FIG. 1(b) depicts a scanning electron microscopy (SEM) image of mesoporous MCM-41 particles within C-PAM. In (a), the stereo microscopy image of pristine C-PAM shows a three-dimensional micrograph of the cross-section of the C-PAM beads. It is evident from the micrograph that the structure of the C-PAM beads has a densely crosslinked, three-dimensional network. The SEM image in (b) shows that the mesoporous MCM-41 particles are enwrapped in the three-dimensional network. The organic thin film 200 and backbone 220 are indicated by circles and arrows respectively. FIG. 2(a) shows a similar SEM image at lesser magnification of these C-MCM-41/PAM composite beads.

FIGS. 2(b) and (c) provide photographs of the composite beads after they have been formed and dried (b) and after freeze-drying (c).

Example 2. Synthesis of APTES-Grafted Mesoporous Silica/Acrylamide Composite 15.608 mL of 3-aminopropyltriethoxy-silane (APTES, 99%, from Sigma-aldrich) was added into de-ionised water and subsequently adjusted to pH 2-4 by adding nitric acid solution under constant stirring. 40 g of mesoporous silica MCM-41 powder was added into this solution and left to stir overnight. 0.7 g of a commercial dispersant (acrylic acid, ammonium salt polymer, catalog No. 8678, MONOMER-POLYMER AND DAJAC LABS), 0.2 g of polyvinylpyrrolidone, 30 g of acrylamide (AM) and 2 g of N,N'-methylenebis(acrylamide) (MBAM) were added into the as-prepared mixture. The mixture then underwent planetary ball milling for 30 min, followed by de-gassing to achieve a homogeneous slurry. 30 g of 2 wt. % ammonium persulfate (APS) solution and 15 g of 2 wt. % N,N,N',N'-tetramethylethylenediamine (TEMED) solution were then added into the homogenous slurry to afford a mixed slurry. The mixed slurry was then sucked into a silicone tube and heated at 80° C. in an oven for 45 min. The mixture was then extracted for cutting and drying. The chloride removal efficiency of the composite bars was found to be ~100 mg·g$^{-1}$.

Example 3. Synthesis of Mesoporous Silica/Acrylamide Composite Using SBA 20 g of mesoporous silica (SBA-15) powders, 0.7 g of a commercial dispersant (acrylic acid, ammonium salt polymer, catalog No. 8678, MONOMER-POLYMER AND DAJAC LABS) and 0.2 g of polyvinylpyrrolidone, were added into a premixed solution consisting of 24 g of acrylamide (AM) and 1.6 g of N,N'-methylenebisacrylamide (MBAM) in 96 g of $H_2O$. The mixture then underwent planetary ball milling for 30 min, followed by de-gassing to obtain a homogeneous slurry. 24 g of 2 wt. % ammonium persulfate (APS) solution and 12 g of 2 wt. % N,N,N',N'-tetramethylethylenediamine (TEMED) solution were then added into the homogenous slurry to achieve a mixed slurry. The mixed slurry was then sucked into a silicone tube and heated at 80° C. in an oven for 45 min. The mixture was then extracted out for cutting and freeze drying. The material was cut into small cylindrical bars having a diameter of around 2 mm and a length of from 2-3 mm. The chloride anion removal efficiency of the composite bars was found to be 76.5 mg·g$^{-1}$.

Figure 4:
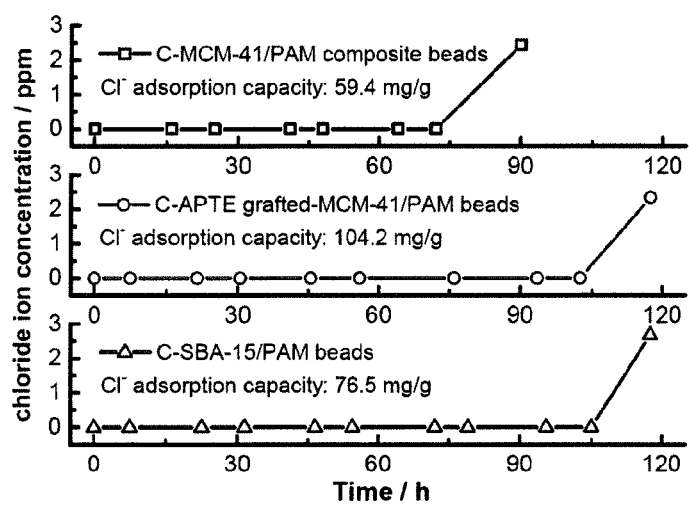
FIG. 4 shows chloride ion breakthrough curves and adsorption capacities on C-MCM-41/PAM, C-APTES grafted-MCM-41/PAM and C-SBA-15/PAM composite beads, respectively.

FIG. 4 shows the breakthrough curves and accumulated HCl adsorption capacity of C-MCM-41/PAM, C-APTES grafted-MCM-41/PAM and C-SBA-15/PAM composites. As shown in FIG. 4, the adsorption capacity of C-MCM-41/PAM, C-APTES grafted-MCM-41/PAM and C-SBA-15/PAM composites are 59.4 mg/g, 104.2 mg/g and 76.5 mg/g, respectively, which imply the chloride anion removal capability of C-APTES grafted-MCM-41/PAM composite has been successfully enhanced by grafting APTES on the substrates.

Example 4. Synthesis of a Mesoporous Silica/Acrylic Acid Composite (C-MCM-41/PAC)

24 g of mesoporous silica powders (MCM-41) and 0.12 g of a commercial dispersant (acrylic acid, ammonium salt polymer, catalog No. 8678, MONOMER-POLYMER AND DAJAC LABS) were added into a premixed solution consisting of 11.76 g of acrylic acid (AC) and 0.78 g of N,N'-methylenebis(acrylamide) (MBAM) in 47.06 g of $H_2O$. The mixture then underwent planetary ball milling for ≥30 min, followed by de-gassing to obtain a homogeneous slurry. 11.76 g of 2 wt. % ammonium persulfate (APS) solution and 11.76 g of 2 wt. % N,N,N',N'-tetramethylethylenediamine (TEMED) solution were then added into the homogenous slurry to achieve a mixed slurry. The mixed slurry was then sucked into a silicone tube and heated at 90° C. in an oven for 45 min. The mixture was then extracted out for cutting and drying. The ammonium cation removal efficiency of the wet composite bars was found to be ~48.3 mg·g$^{-1}$.

Example 5. Synthesis of Kaolinite/Acrylic Acid Composite (C-Kaolinite/PAC)

90 g of kaolinite powders and 0.8 g of a commercial dispersant (acrylic acid, ammonium salt polymer, catalog No. 8678, MONOMER-POLYMER AND DAJAC LABS) were added into a premixed solution consisting of 22.06 g of acrylic acid (AC) and 1.47 g N,N'-methylenebis(acrylamide) (MBAM) in 88.23 g of $H_2O$. The mixture then underwent planetary ball milling for ≥120 min, followed by de-gassing to obtain a homogeneous slurry. 22.06 g of 2 wt. % of ammonium persulfate (APS) solution and 11.03 g of 2 wt. % of N,N,N',N'-tetramethylethylenediamine (TEMED) solution were then added into the homogenous slurry to achieve a mixed slurry. The mixed slurry was then sucked into a silicone tube and heated at 90° C. in an oven for 45 min. The mixture was then extracted out for cutting and drying. The ammonium cation removal efficiency of the wet composite bars was found to be ~39.7 mg·g$^{-1}$.

Figure 6:
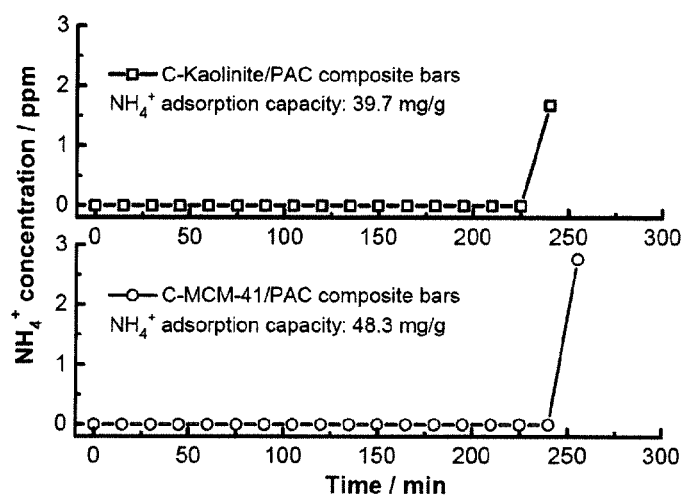
FIG. 6 shows ammonium cation breakthrough curves and adsorption capacities on C-MCM-41/PAC and C-Kaolinite/PAC composite bars, respectively.

FIG. 6 shows the breakthrough curves and accumulated ammonium cations adsorption capacity of wet C-Kaolinite/PAC and C-MCM-41/PAC composites. As shown in FIG. 6, the adsorption capacity of wet C-Kaolinite/PAC and C-MCM-41/PAC composites are 39.7 mg/g and 48.3 mg/g, respectively. As ammonia is very volatile, the water in the composite material sample helps to adsorb some of the ammonia. The ammonia adsorption capacity of the dry composite sample is less than 10 mg/g.

Example 6. Synthesis of C-MCM-41/PAM Composite Beads with Varying Solid State Loading Values In order to investigate the water uptake of C-MCM-41/PAM composite beads, C-MCM-41/PAM beads were fabricated using different solid state loading values (volume %) by the gel-casting technique described in Example 1. Thus, the composite materials in this example were made by analogy to the method described in Example 1. The pure water uptake of the C-MCM-41/PAM beads as a function of different vol. % solid state loading is provided in FIG. 7.

Table 2 lists the amounts of each material used to form samples 1 to 4 (DIS represents dispersant). The solid state loading value in volume percent is based upon equation (7):

$$Vol(\%) = \frac{\text{Volume } MCM-41}{(\text{Volume } MCM-41 + \text{Volume Water})} \times 100\% \quad (7)$$

The density of MCM-41 is 0.34 g/ml and it is assumed that the density of water is 1 g/ml. Thus, the solid state loading value presented below is approximate because it is only based upon the slurry formed by the addition of MCM-41 to water and does not include the other components of the reagents needed to form the composite materials of samples 1-4.

TABLE 2

| Sample S/N | Solid State Loading (vol %) | MCM-41 (grams) | $H_2O$ (grams) | MBAM (grams) | APS (grams) | AM (grams) | DIS (drops) |
|---|---|---|---|---|---|---|---|
| 1 | 50 | 12 | 35.294 | 0.5882 | 8.8236 | 8.8236 | 24 |
| 2 | 55 | 12 | 28.876 | 0.4812 | 7.219 | 7.219 | 24 |
| 3 | 60 | 12 | 23.53 | 0.3922 | 5.8816 | 5.8816 | 24 |
| 4 | 65 | 12 | 19.0044 | 0.3168 | 4.7512 | 4.7512 | 24 |

The test was conducted with the following procedure: the dried beads were weighed ($W_{dry}$) and soaked in deionized water for 168 h at 40° C. The reason for choosing 40° C. as the testing temperature is to simulate the temperature of the exhaust gas discharged from the chlor-alkaline plants. Subsequently, the beads were removed from the deionized water and weighed ($W_{wet}$) using an electronic weighing balance after the removal of surface water using filtration paper. Using the equation (8), the water uptake can be calculated:

$$w_{H_2O} = \frac{w_{wet} - w_{dry}}{w_{dry}} \times 100\% \quad (8)$$

Figure 7:
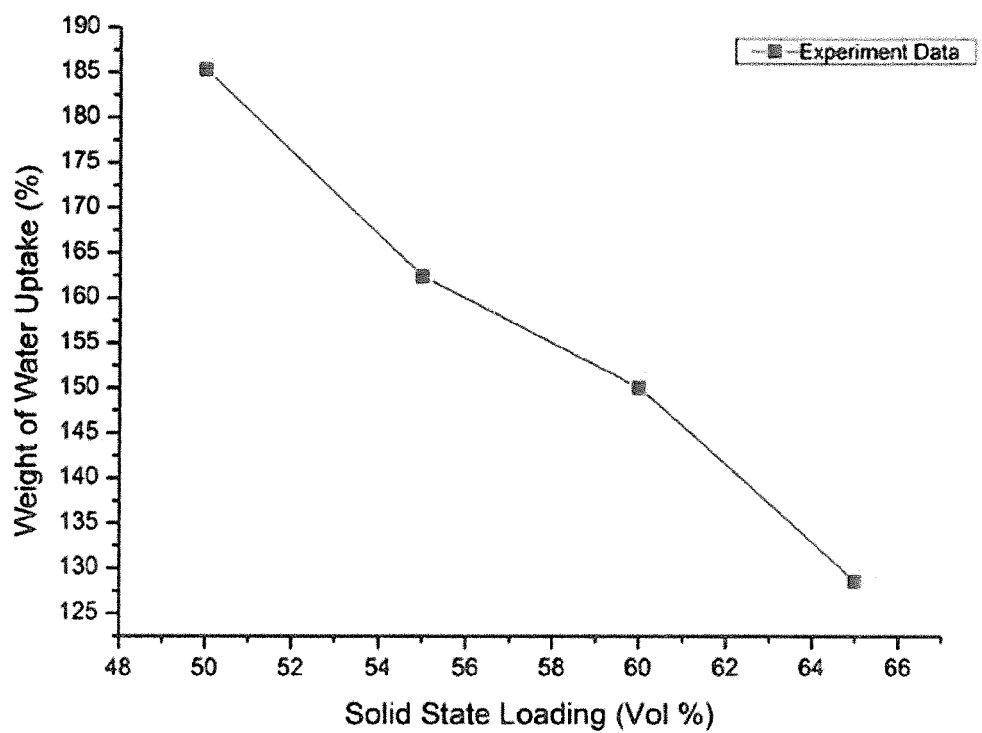
FIG. 7 depicts the relationship between solid state loading (vol %) and weight of water uptake.

FIG. 7 depicts the relationship between solid state loading (vol %) and weight of water uptake. As shown in the figure, the weight of water uptake increases as the solid state loading decreases.

Example 7. Use of C-MCM-41/PAM Composite Beads as a Pre-Scrubber in a Fuel Cell A 200 W fuel cell system was set up to be filled with hydrogen gas produced from a chlor-alkali plant. The chemical composition of the hydrogen gas is described in Table 1 above. The hydrogen gas produced from the chlor-alkali plant was passed through a scrubber system containing 456 g of C-MCM-41/PAM Composite Beads prepared in accordance with Example 1 before entering into the fuel cell system, having a theoretical capacity of 27,086.4 mg of chloride, based on an adsorption capacity of 59.4 mg/g of composite material. The system was operated for a total of 6 hours and there was no degradation of performance in the fuel cell other this time period, which would have been expected if chloride and/or chlorine gas was entering the system. At the end of the six hours of operation, the composite beads had scrubbed over 3,000,000 mL of gas of chloride (theoretical amount of chloride was about 5 mg) and weighed 486 g, which is primarily due to the absorption of water from the impure hydrogen gas. This experiment demonstrates that the composite material can remove chloride from a gas stream and help maintain the optimum performance of a fuel cell fed with gas originating from a chlor-alkali plant.

The invention claimed is:
1. A composite material comprising:
   a particulate adsorbing material; and
   a crosslinked polymer comprising acidic or basic residues, wherein the particulate adsorbing material is dispersed throughout a polymer matrix formed by the crosslinked polymer, and the particulate adsorbing material is selected from the group consisting of mesoporous silica, mesoporous carbon, mesoporous zinc oxide, a bentonite clay, and a kaolinite clay.

2. The composite according to claim 1, wherein the weight:weight ratio of the particulate adsorbing material to crosslinked polymer is from 0.5:1 to 5:1.

3. The composite according to claim 1, wherein the particulate adsorbing material is selected from one or more of the group consisting of mesoporous silica, a bentonite clay, and a kaolinite clay.

4. The composite according to claim 3, wherein the particulate adsorbing material is a mesoporous silica.

5. The composite according to claim 1, wherein the particulate adsorbing material further comprises functional groups selected from a C1-10 alkylamine and a C1-10 alkylcarboxylic acid.

6. The composite according to claim 5, wherein the C1-10 alkylamine is n-propylamine.

7. The composite according to claim 5, wherein the weight ratio of the functional groups to the particulate material is from 0.05:1 to 1:1.

8. The composite according to claim 1, wherein, when the crosslinked polymer has basic residues, it is formed from a monomeric material that has at least one ethylenic bond and an amide functional group.

9. The composite according to claim 1, wherein, when the crosslinked polymer has basic residues, the weight:weight ratio of the particulate adsorbing material to crosslinked polymer is from 0.8:1 to 2:1.

10. The composite according to claim 1, wherein, when the crosslinked polymer has acidic residues, it is formed from a monomeric material that has at least one ethylenic bond and a carboxylic acid functional group.

11. The composite according to claim 1, wherein when the crosslinked polymer has acidic residues, the weight:weight ratio of the particulate adsorbing material to crosslinked polymer is from 2:1 to 4.2:1.

12. The composite according to claim 1, wherein the crosslinked polymer comprises a residue from a crosslinking agent and the crosslinking agent is selected from one or more of the group consisting of N,N'-methylenebis(acrylamide) and N,N'-diallyl-L-tartardiamide.

13. The composite according to claim 12, wherein the crosslinking agent is N,N'-methylenebis(acrylamide).

14. The composite material according to claim 1, wherein the composite material is selected from:

(a) a composite comprising mesoporous silica and crosslinked acrylamide in a weight:weight ratio of about 1.56:1, where the crosslinking agent is N,N'-methylenebis(acrylamide), which is present in a weight:weight ratio of 1:15 with respect to the acrylamide monomer; and (b) a composite comprising a n-propylamine-functionalised mesoporous silica and crosslinked acrylamide in a weight:weight ratio of about 1.71:1, where the crosslinking agent is N,N'-methylenebis(acrylamide), which is present in a weight:weight ratio of 1:15 with respect to the acrylamide monomer and the functional group is present in about a 0.37:1 weight ratio with respect to the mesoporous silica.

15. A method of forming a composite material according to claim 1, wherein the process comprises the steps of:
 (i) forming a mixture comprising a particulate adsorbing material, at least one monomer having an ethylenic bond and a carboxylic acid or basic functional group, a crosslinking agent, a polymerisation initiator and a catalyst in a solvent; and
 (ii) initiating a polymerisation reaction to form the composite material.

16. The method according to claim 15, wherein the mixture in step (i) further comprises a C1-10 alkylaminetrialkyloxysilane or a C1-10 alkylcarboxylic acid trialkyloxysilane, or the particulate adsorbing material is provided pre-functionalized by C1-10 alkylamine or a C1-10 alkylcarboxylic acid groups.

17. A method of purifying a gas, comprising contacting the gas with a composite material according to claim 1, wherein a composite material comprising acidic residues is used to remove basic impurities from a gas in need thereof and a composite material comprising basic residues is used to remove acidic impurities from a gas in need thereof.

18. The composition according to claim 4, wherein the particulate adsorbing material is a mesoporous silica selected from one or more of the group consisting of SBA-15, SBA-16, MCM-41, MCM-48, HMS, MSU-F, MSU-H, and MSU-X.

19. The composition according to claim 8, wherein the monomeric materials are selected from one or more of the group consisting of acrylamide, methacrylamide, an alkyl-acrylamide, an alkyl-methacrylamide, dimethyl aminopropyl methacrylamide, a hydroxy-alkyl acrylamide, and a hydroxy-alkyl methacrylamide.

20. The composition according to claim 10, wherein the monomeric material is methacrylic acid and/or acrylic acid.

* * * * *